United States Patent [19]

Beyer et al.

[11] Patent Number: 4,781,389

[45] Date of Patent: Nov. 1, 1988

[54] FLAT SEALING GASKET HAVING GRAPHITE-FILLED ARMOR

[75] Inventors: Horst Beyer, Burscheid; Karl-Heinz Maus, Wuppertal; Detlev Lachnit, Leverkusen; Klaus Lönne, Burscheid; Klaus-Peter Majewski, Burscheid; Hans-Rainer Zerfass, Burscheid, all of Fed. Rep. of Germany

[73] Assignee: Goetze AG, Burscheid, Fed. Rep. of Germany

[21] Appl. No.: 890,947

[22] Filed: Jul. 31, 1986

[30] Foreign Application Priority Data

Aug. 9, 1985 [DE] Fed. Rep. of Germany ....... 3528614

[51] Int. Cl.⁴ .............................................. F16J 15/12
[52] U.S. Cl. ................. 277/235 B; 277/227; 277/DIG. 6
[58] Field of Search ........... 277/235 R, 235 A, 235 B, 277/166, 188 R, 188 A, 180, DIG. 6, 227, 229, 233, 234

[56] References Cited

U.S. PATENT DOCUMENTS

| | | | |
|---|---|---|---|
| 3,404,061 | 10/1968 | Shane et al. | 277/DIG. 6 X |
| 3,741,855 | 6/1973 | Harrison et al. | 277/DIG. 6 X |
| 4,006,881 | 2/1977 | Gaillard | 277/DIG. 6 X |
| 4,083,570 | 4/1978 | Sugawara | 277/235 B |
| 4,190,257 | 2/1980 | Schnitzler | 277/DIG. 6 X |
| 4,243,231 | 1/1981 | Sugawara | 277/235 B X |
| 4,325,559 | 4/1982 | Czernik et al. | 277/235 B |
| 4,350,346 | 9/1982 | Fowler | 277/DIG. 6 X |
| 4,397,472 | 8/1983 | Czernik | 277/235 B |
| 4,465,287 | 8/1984 | Bindel et al. | 277/DIG. 6 X |

FOREIGN PATENT DOCUMENTS

| | | | |
|---|---|---|---|
| 1056660 | 6/1979 | Canada | 277/DIG. 6 |
| 0041906 | 12/1981 | European Pat. Off. | |
| 2713542 | 10/1978 | Fed. Rep. of Germany | 277/235 B |
| 2826386 | 12/1979 | Fed. Rep. of Germany | 277/235 B |
| 3005792 | 8/1981 | Fed. Rep. of Germany | |
| 3423787 | 2/1986 | Fed. Rep. of Germany | |
| 2308843 | 11/1976 | France | 277/227 |
| 52-66140 | 6/1977 | Japan | 277/DIG. 6 |
| 58-124864 | 7/1983 | Japan | 277/DIG. 6 |
| 58-210343 | 12/1983 | Japan | 277/235 B |
| 60-73171 | 4/1985 | Japan | 277/227 |
| 2124309 | 2/1984 | United Kingdom | 277/235 B |
| 2146712 | 4/1985 | United Kingdom | 277/DIG. 6 |

Primary Examiner—Robert S. Ward
Attorney, Agent, or Firm—Spencer & Frank

[57] ABSTRACT

A flat sealing gasket includes an opening defined by a gasket edge and a sheet metal armor framing the gasket edge. The armor at least partially encloses an annular space which is situated radially inwardly of the gasket edge and is generally concentric with the gasket opening. Further, a graphite filling is accommodated in the annular space.

16 Claims, 1 Drawing Sheet

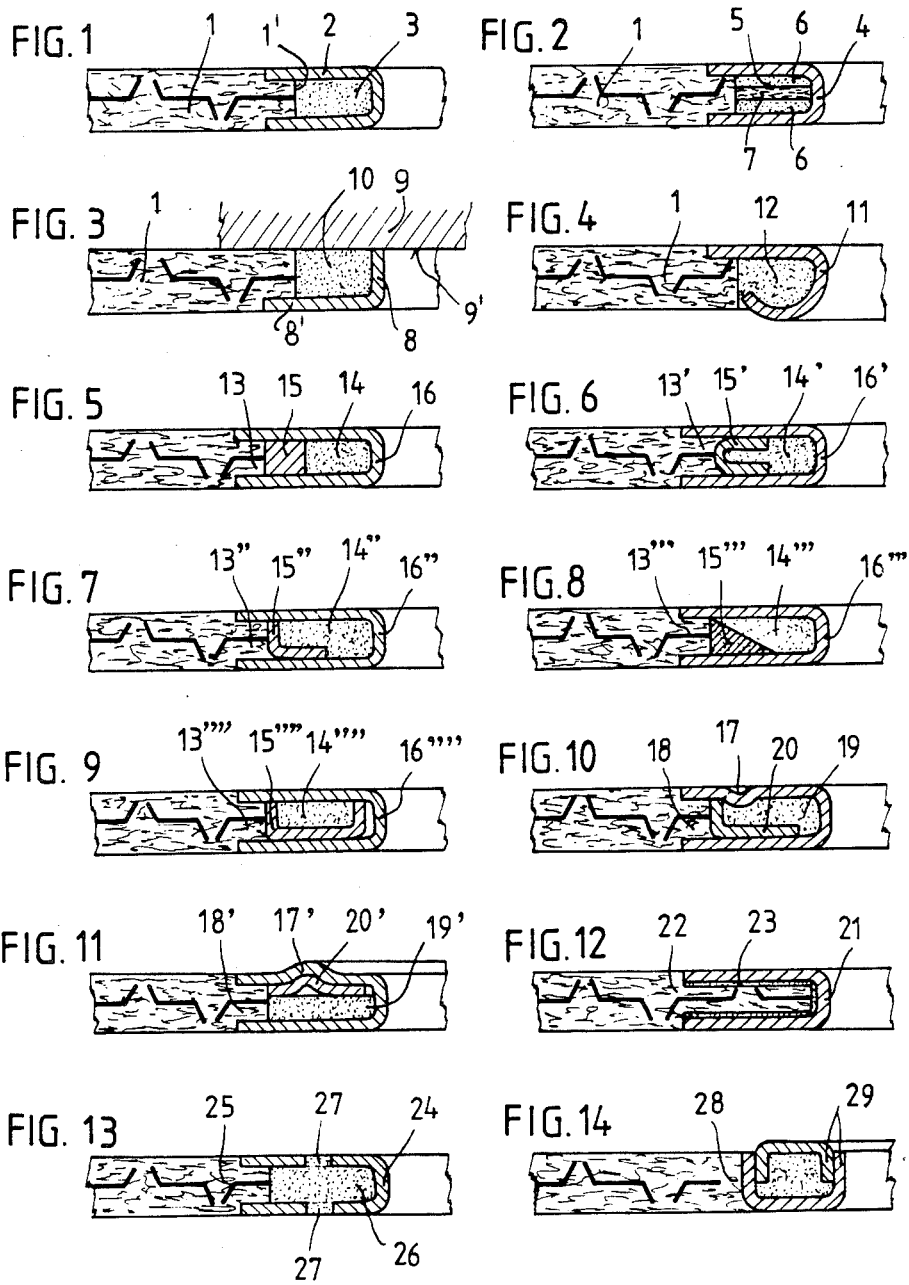

4,781,389

FLAT SEALING GASKET HAVING GRAPHITE-FILLED ARMOR

BACKGROUND OF THE INVENTION

This invention relates to a flat sealing gasket, particularly a cylinder head gasket used in an internal combustion engine. The gasket has several large circular openings for alignment with a respective combustion chamber of the engine. The gasket edge defining each such opening is framed by a sheet metal armor and further, along such gasket edge means are provided to improve the sealing conditions.

Cylinder head gaskets for internal combustion engines comprise soft-material mats which may be metal-reinforced or steel sheet plates. Particularly for protecting the gasket edges surrounding the combustion chambers from the effects of the hot combustion gases and for the purpose of increasing the sealing pressure, the edges defining the openings are framed by means of an armor made of sheet metal and having an approximately U-shaped cross section. The legs of the U extend on opposite sides of the gasket mat in a face-to-face engagement therewith. For improving the sealing effect it is known to insert sheet metal rings of, for example, circular or rectangular cross section or elastic coil spring rings along the gasket edge in the zone surrounded by the armor. Further, forepieces constituted usually by metal rings at the gasket edges are also known.

U.S. Pat. No. 4,397,472 discloses a metal-reinforced soft-material cylinder head gasket whose metal plate projects radially inwardly along the gasket edge (which defines an opening to be aligned with a combustion chamber) and is deformed there to constitute an annular bead. The hollow space enclosed by the bead is filled with graphite and is surrounded by a metallic frame or armor.

High elasticity and only a slight thermosetting property are significant conditions for an optimal sealing behavior at the combustion chamber edge of the cylinder head gasket. By virtue of the stresses during engine operation, however, at the gasket edge a continuous oscillating stress is present due to the significant axial oscillations of the associated engine cylinder. The coil spring rings inserted into the metal frames and also the inserted or adjacently positioned metal rings lose at least some of their resilient properties due to the additionally present significant heat stress and further, there may occur a significant thermosetting at the gasket edge in a non-uniform distribution about the circumference, eventually resulting in leakages at the seal.

SUMMARY OF THE INVENTION

It is an object of the invention to provide an improved flat sealing gasket of the above-outlined type in which sealing failure at the gasket edge surrounding the combustion chamber is optimally prevented with simple and inexpensive measures even if exposed to long-lasting stresses during service.

This object and others to become apparent as the specification progresses, are accomplished by the invention, according to which, briefly stated, the flat sealing gasket includes an opening defined by a gasket edge and a sheet metal armor framing the gasket edge. The armor at least partially encloses an annular space which is situated radially inwardly of the gasket edge and is generally concentric with the gasket opening. Further, a graphite filling is accommodated in the annular space.

The graphite filler is made preferably of expanded graphite in powdery, flaky, fiber or foil shape.

According to a further feature of the invention, for the purpose of increasing the strength of the graphite, the filler contains a binder and/or the graphite contains up to 50% by weight short metal fibers, organic synthetic fibers or inorganic fibers and/or sintered metal powder.

By virtue of filling the space enclosed by the armor at the gasket edge with graphite material according to the invention, optimal temperature-resistant properties and the good heat conductivity of the graphite are utilized in order to obtain an optimal and long-life sealing effect at the gasket edge. Since the graphite filler is fully enclosed by the armor and the gasket edge, during installation of the gasket there occurs only an elastic deformation of the graphite filler under the sealing pressure, while the high elastic rebounding property and thus a good sealing property of the graphite is preserved. The high-temperature resistance of the graphite prevents a significant thermosetting of the filler under rising temperatures so that the sealing at the framed gasket edge performs its sealing function in a superior manner even in a continuous operation at high temperatures.

According to a simple embodiment of the invention, the free space formed by the frame along the gasket edge is entirely filled with the graphite mass whereby the frame and the gasket edge together encapsulate the graphite filler. For improving the encapsulating effect, between the combustion chamber edge and the graphite filler an additional metal ring is inserted. The metal ring has a maximum height which corresponds to the gasket thickness. Such ring may have a rectangular or triangular cross section. Preferably, the ring has an L or U-shaped cross section, with the open part oriented towards the graphite filler According to the invention, the frame at the gasket edge may lie on the gasket with only one leg while the other leg is crimped to form a hollow space which may be open towards the sealing face. The hollow space is filled with a graphite mass. Further, instead of a graphite-filled frame a graphite-filled insert ring (annular insert) may be used which is attached to the sealing edge of the gasket. Or, the inner side of the frame may be provided with a graphite layer.

Thus, the invention provides a sealing gasket which, along the edges which define openings to be aligned with the combustion chambers, have an optimal sealing effect. Even in long-period operations under high mechanical and temperature stresses the framed zone does not lose any of its resilient force and thus the sealing effect does not deteriorate. The various embodiments to practice the invention may be manufactured simply and economically. More complex and expensive embodiments may also be provided for special cylinder head gaskets exposed to extremely high loads.

BRIEF DESCRIPTION OF THE DRAWING

FIGS. 1–14 are cross-sectional views of fourteen preferred embodiments of the invention.

DESCRIPTION OF THE PREFERRED EMBODIMENTS

Turning to FIG. 1, the cylinder gasket plate 1 has a cross-sectionally U-shaped metal armor 2 framing a peripheral gasket edge 1' which defines a generally circular gasket opening adapted to be aligned with an internal combustion chamber of the engine. The space 3 defined by the legs of the armor 2 extends radially inwardly of the gasket edge 1' and is filled with a graphite mass which is entirely encapsulated by the armor 2 and the edge 1' of the gasket 1. Stated differently, the space 3 has four sides: one side is bounded by the peripheral edge 1' and the other three sides are bounded by the armor 2.

In FIG. 2, the space 5 defined by the armor 4 receives a laminated component formed of a non-woven fiber disc 7 sandwiched between two graphite layers 6.

Turning to FIG. 3, the armor 8 engages the gasket 1 only with a single leg 8'. The cross-sectionally L-shaped armor 8 forms a space 10 which is filled with the graphite mass so that upon installation the graphite mass is encapsulated by the frame 8 of the sealing gasket 1 and the sealing face 9' of the cylinder head 9.

In FIG. 4, the frame or armor 11 is crimped to enclose a space 12 which is filled with the graphite mass.

In the cross-sectional illustrations of the embodiment illustrated in FIG. 5, between the sealing edge 13 of the gasket and the graphite-filled space 14 there is inserted a metal ring 15 whereby the graphite mass is fully encapsulated by the armor 16 and the metal ring 15. FIGS. 6–9 show variants of the FIG. 5 structure. In the embodiment of FIGS. 6–9 the reference numerals designating the graphite filling, the metal ring and the armor are provided with a prime sign (FIG. 6), a double prime sign (FIG. 7), a triple prime sign (FIG. 8) and a quadruple prime sign (FIG. 9), respectively. The metal ring 15 has a rectangular cross section (FIG. 5 embodiment), a U-shaped cross section (15' in the FIG. 6 embodiment) an L-shaped cross section (15" in the FIG. 7 embodiment), a triangular cross section (15''' in the FIG. 8 embodiment) and a rectangular, trough-like cross section (15'''' in the FIG. 9 embodiment). The axial height of the rings is approximately equal to the thickness of the sealing gasket 13, less the dual thickness of the armor plate.

In FIGS. 10 and 11, one leg of the frame is provided with a bead 17, 17', respectively. In FIG. 10, between the gasket edge 18 and the graphite filling 19 there is provided a metal ring 20 of L-shaped cross section, whereas in the FIG. 11 embodiment, on the graphite filling 19' there lies a beaded ring 20 complemental with the beaded portion 17' of the armor.

In FIG. 12, the armor 21 of the sealing gasket 22 is provided at the inside with a graphite coating 23.

In the embodiment illustrated in FIG. 13, the opposite legs of the cross-sectionally U-shaped frame or armor 24 of the sealing gasket 25 have openings 27 which are circumferentially uniformly distributed so that the graphite filling may be extruded from the space 26 through the openings 27 upon high sealing pressures. The openings are circumferentially distributed radially inwardly of the gasket edge and connect the space 26 with the exterior, at locations which are coplanar with opposite large surfaces of the gasket.

In the embodiment illustrated in FIG. 14, adjacent and radially inwardly of the gasket edge 28 there is inserted a two-part, graphite-filled ring 29 which, upon installation of the sealing gasket, is compressed in an axial direction by the sealing pressure.

It will be understood that the above description of the present invention is susceptible to various modifications, changes and adaptations, and the same are intended to be comprehended within the meaning and range of equivalents of the appended claims.

What is claimed is:

1. In a flat sealing gasket made of a gasket material and including a generally circular opening defined by a peripheral gasket edge and a sheet metal armor of U-shaped cross section framing the peripheral gasket edge and having an open side oriented radially outwardly away from said generally circular opening and three closed sides; the improvement wherein said armor encloses on three sides a four-sided annular space situated radially inwardly of said gasket edge; said annular space extending generally concentrically with said opening; further comprising a graphite filling being separate from said gasket material and occupying said space; said graphite filling being bounded on three sides by said armor; and blocking means for circumferentially closing said open side for encapsulating said graphite filling in said four-sided space to prevent escape of the graphite filling from said space in a radially outward direction.

2. A flat sealing gasket as defined in claim 1, wherein the graphite filling comprises graphite powder.

3. A flat sealing gasket as defined in claim 1, wherein the graphite filling comprises graphite flakes.

4. A flat sealing gasket as defined in claim 1, wherein the graphite filling comprises graphite foils.

5. A flat sealing gasket as defined in claim 1, wherein the graphite filling comprises graphite fiber.

6. A flat sealing gasket as defined in claim 1, wherein the graphite filling comprises a binder.

7. A flat sealing gasket as defined in claim 1, wherein said graphite filling contains up to 50% by weight an additional material selected from the group consisting of short metal fiber, ceramic fiber, organic synthetic fiber, mineral fiber and sintered metal powder.

8. A flat sealing gasket as defined in claim 1, wherein said sheet metal armor comprises a hollow annular insert being in engagement with said gasket and situated radially inwardly of said gasket edge concentrically with said opening; said hollow annular insert being entirely filled with said graphite filling.

9. A flat sealing gasket as defined in claim 1, further comprising a plurality of circumferentially uniformly distributed apertures provided in said armor; each said aperture leading from said space to an exterior of said gasket, to a location generally coplanar with a large face of said gasket.

10. A flat sealing gasket as defined in claim 1, further comprising a metal ring arranged concentrically with respect to said opening and situated between said gasket edge and said graphite filling.

11. A flat sealing gasket as defined in claim 10, wherein said metal ring has an L-shaped cross section.

12. A flat sealing gasket as defined in claim 10, wherein said metal ring has a U-shaped cross section.

13. A flat sealing gasket as defined in claim 1, wherein said armor has a U-shaped cross section and is bent about said gasket edge and engages opposite gasket faces along annular gasket zones bounding said gasket edge.

14. A flat sealing gasket as defined in claim 13, wherein said graphite filling comprises a coating carried on inner surfaces of said armor; said gasket edge being surrounded by an annular gasket zone projecting into said annular space.

15. A flat sealing gasket as defined in claim 1, wherein said blocking means comprises said peripheral gasket edge.

16. A flat sealing gasket as defined in claim 15, said peripheral gasket edge being in direct contact with said graphite filling.

* * * * *